(12) United States Patent
Pettit

(10) Patent No.: US 10,807,447 B1
(45) Date of Patent: Oct. 20, 2020

(54) RETRACTABLE SUNSCREEN

(71) Applicant: Traci Pettit, Decatur, TX (US)

(72) Inventor: Traci Pettit, Decatur, TX (US)

( * ) Notice: Subject to any disclaimer, the term of this patent is extended or adjusted under 35 U.S.C. 154(b) by 184 days.

(21) Appl. No.: 16/133,758

(22) Filed: Sep. 18, 2018

Related U.S. Application Data

(63) Continuation-in-part of application No. 15/464,448, filed on Mar. 21, 2017, now Pat. No. 10,160,294.

(51) Int. Cl.
*B60J 1/20* (2006.01)

(52) U.S. Cl.
CPC .......... *B60J 1/2077* (2013.01); *B60J 1/2033* (2013.01); *B60J 1/2047* (2013.01)

(58) Field of Classification Search
CPC ...... B60J 1/2033; B60J 1/2047; B60J 1/2077; B61D 45/006; B60P 7/135; B60P 7/15
USPC .................................. 296/97.7; 410/123, 122
See application file for complete search history.

(56) References Cited

U.S. PATENT DOCUMENTS

| | | | | |
|---|---|---|---|---|
| 2,594,208 A * | 4/1952 | Pilot | .................... | B61D 45/006 410/129 |
| 3,059,593 A * | 10/1962 | Mack | ........................ | B60P 7/14 410/151 |
| 3,183,033 A * | 5/1965 | Stulbach | ................. | B60J 1/2069 296/97.2 |
| 4,373,569 A * | 2/1983 | Barettella | ................. | E06B 9/44 160/263 |
| D365,075 S | 12/1995 | Hernandez | | |
| 5,495,884 A * | 3/1996 | Shikler | .................... | B60J 1/2069 160/120 |
| 5,562,144 A | 10/1996 | Ming-Shun | | |
| 5,653,278 A | 8/1997 | Cheng | | |
| 5,791,721 A | 8/1998 | Lin | | |
| 5,833,414 A * | 11/1998 | Feldman | ................... | B60P 7/15 410/151 |
| 5,845,956 A * | 12/1998 | Yang | ...................... | B60J 1/2063 296/97.8 |
| 5,890,856 A * | 4/1999 | Huang | ...................... | B60P 7/15 410/143 |
| 6,131,643 A * | 10/2000 | Cheng | ...................... | B60J 11/02 160/24 |
| 6,210,090 B1 * | 4/2001 | Wyse | ........................ | B60P 7/15 410/122 |
| 6,330,898 B1 * | 12/2001 | Chang | ..................... | B62B 9/145 160/24 |
| 6,626,624 B1 * | 9/2003 | Kopperud | ................. | B60P 7/14 410/118 |
| 7,143,805 B1 * | 12/2006 | Weir | ...................... | B60J 1/2063 160/370.22 |
| 7,216,917 B2 | 5/2007 | Tadakamalla | | |
| 7,793,911 B2 * | 9/2010 | Fontana | ................. | A63B 27/00 248/231.9 |
| 8,328,481 B2 * | 12/2012 | Koenig | .................... | B60R 7/08 410/129 |
| 8,469,077 B1 | 6/2013 | Allard | | |
| 8,695,682 B2 * | 4/2014 | Lin | ......................... | E06B 9/42 160/370.22 |

(Continued)

*Primary Examiner* — Hilary L Gutman
(74) *Attorney, Agent, or Firm* — Kyle A. Fletcher, Esq.

(57) ABSTRACT

The dashboard-mounted retractable sunscreen comprises a sunshade, a dual hook mechanism and a plurality of jacks. The dual hook mechanism: a) adds one or more additional hooks to the top rod; and, b) allows the position of each of the plurality of hooks to move in a direction parallel to the center axis of the top rod.

18 Claims, 8 Drawing Sheets

(56) References Cited

U.S. PATENT DOCUMENTS

| | | | |
|---|---|---|---|
| 10,081,227 B1* | 9/2018 | Mao | B60J 1/203 |
| 10,639,976 B2* | 5/2020 | Pepe | B60R 13/02 |
| 2006/0065375 A1* | 3/2006 | Chen | B60J 1/208 |
| | | | 160/370.22 |
| 2006/0162878 A1* | 7/2006 | Lin | B60J 1/2033 |
| | | | 160/370.22 |
| 2010/0013262 A1* | 1/2010 | Shu | B60J 1/2038 |
| | | | 296/97.8 |
| 2011/0297334 A1* | 12/2011 | Bohlen | E06B 9/68 |
| | | | 160/310 |
| 2013/0113234 A1 | 5/2013 | Horowitz | |
| 2018/0347269 A1* | 12/2018 | Wang | E06B 9/38 |

* cited by examiner

RETRACTABLE SUNSCREEN

CROSS REFERENCES TO RELATED APPLICATIONS

This non-provisional application is a continuation-in-part application filed under 37 CFR 1.53(b) that claims the benefit of United States 35 USC 120 from non-provisional application U.S. Ser. No. 15/464,448 filed on Mar. 17, 2017, by the inventor: Traci Pettit.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including windscreens, more specifically, a roller screen for reducing heat intensity. (B60J1/2011)

This non-provisional application is a continuation-in-part application filed under 37 CFR 1.53(b) that claims the benefit of United States 35 USC 120 from non-provisional application U.S. Ser. No. 15/464,448 filed on Mar. 17, 2017, by the inventor: Traci Pettit. This non-provisional application incorporates non-provisional application U.S. Ser. No. 15/464,448 in its entirety.

The present disclosure will only reference the elements of the non-provisional application U.S. Ser. No. 15/464,448 that are relevant to the innovations disclosed within this application. This is done for purposes of simplicity and clarity of exposition. The applicant notes that this disclosure incorporates non-provisional application U.S. Ser. No. 15/464,448 in its entirety into this application. The fact that any specific innovation selected from the one or more innovations disclosed within U.S. Ser. No. 15/464,448 is not addressed in this application should not be interpreted as an indication of a defect in the above-referenced patent.

Within this disclosure, the non-provisional application U.S. Ser. No. 15/464,448 will also be referred to as the prior disclosure.

A summary of the disclosures contained within prior disclosure that are relevant to the present disclosure is provided below. This summary is provided for clarity and convenience and is not intended to fully represent or reflect the disclosures contained within the prior disclosure. If a discrepancy occurs between this summary and the prior disclosure, the prior disclosure should be considered correct, and this summary should be considered in error.

A left spring 360 and a right spring 365 are included with the roller subassembly 200, and causes the sunshade 200 to wrap itself around a bottom rod 340 in the housing 320.

An object of the dashboard-mounted retractable sunscreen 100 is to provide shade to the interior of a vehicle by substantially covering the windshield 930 with an opaque sunscreen.

A further object of the dashboard-mounted retractable sunscreen 100 is to provide a sunscreen that may be easily deployed for use when needed and which may be easily retracted when no longer needed.

SUMMARY OF INVENTION

The current presentation of the dashboard-mounted retractable sunscreen discloses enhancements that supplement the prior disclosure.

The dashboard-mounted retractable sunscreen comprises ta sunshade, a dual hook mechanism and a plurality of jacks. The dual hook mechanism: a) adds one or more additional hooks to the top rod; and, b) allows the position of each of the plurality of hooks to move in a direction parallel to the center axis of the top rod.

These together with additional objects, features and advantages of the dashboard-mounted retractable sunscreen will be readily apparent to those of ordinary skill in the art upon reading the following detailed description of the presently preferred, but nonetheless illustrative, embodiments when taken in conjunction with the accompanying drawings.

In this respect, before explaining the current embodiments of the dashboard-mounted retractable sunscreen in detail, it is to be understood that the dashboard-mounted retractable sunscreen is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the dashboard-mounted retractable sunscreen.

It is therefore important that the claims be regarded as including such equivalent construction insofar as they do not depart from the spirit and scope of the dashboard-mounted retractable sunscreen. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
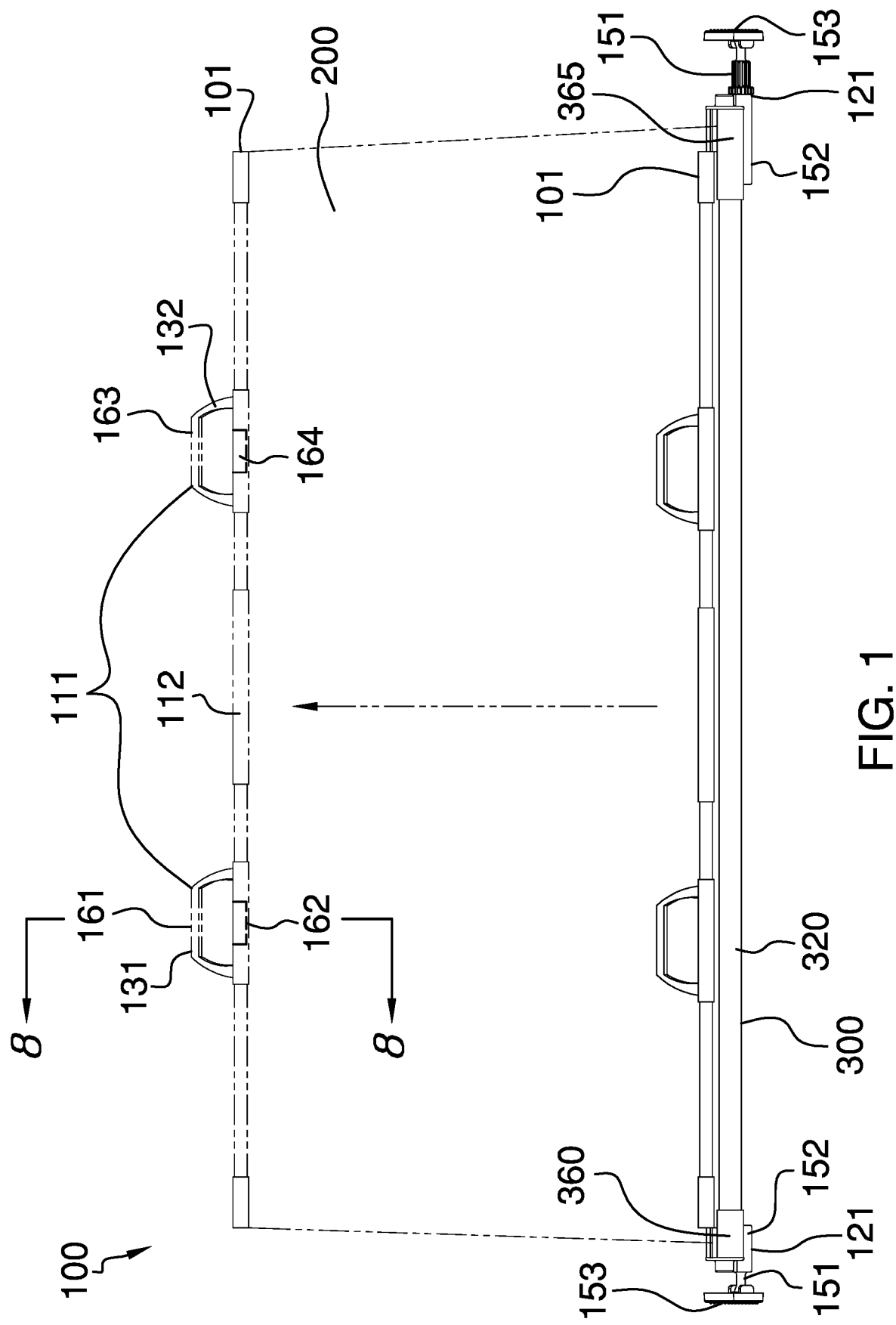
FIG. 1 is a front view of an embodiment of the disclosure.
Figure 2:
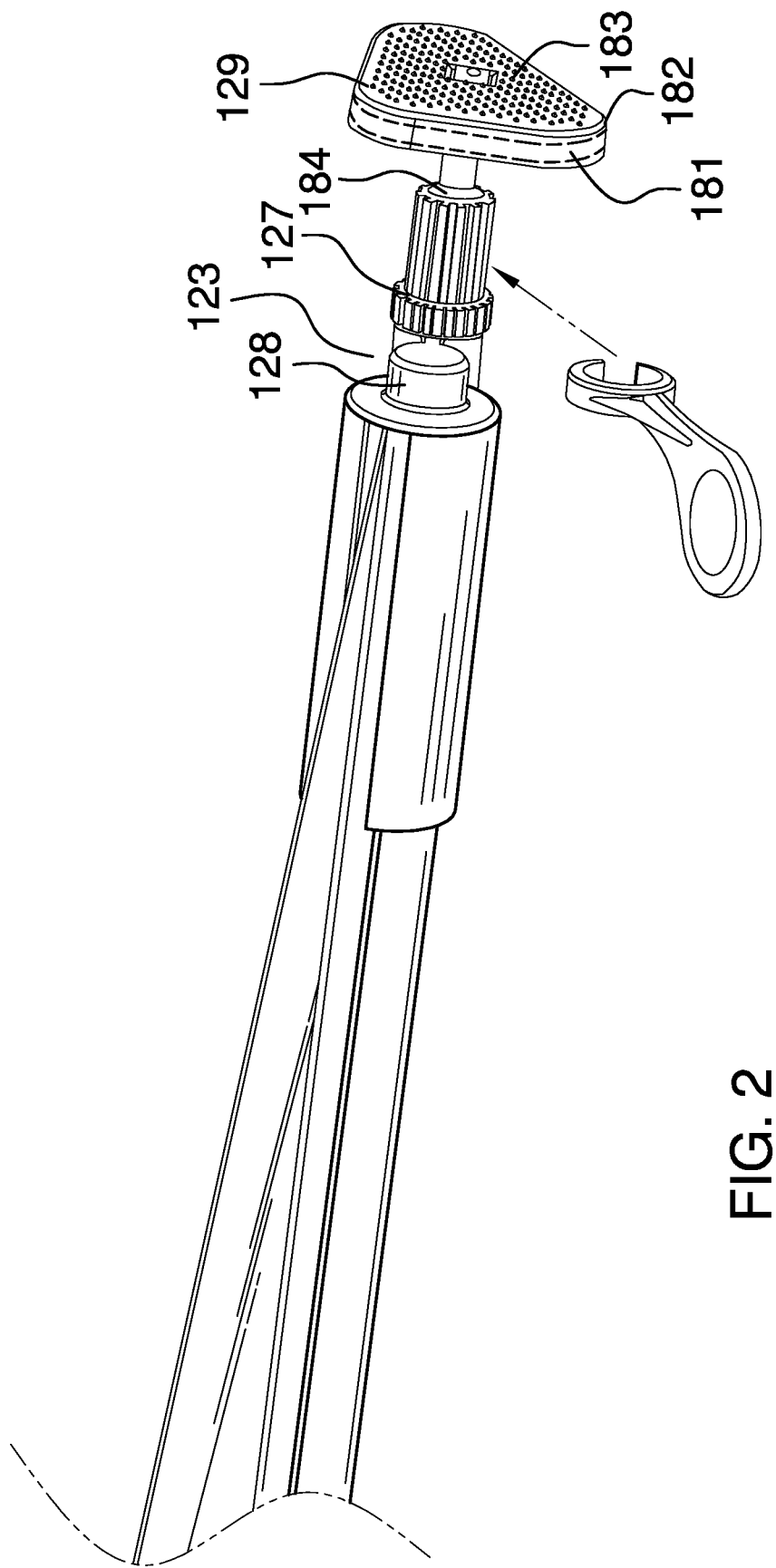
FIG. 2 is a detail view of an embodiment of the disclosure.
Figure 3:
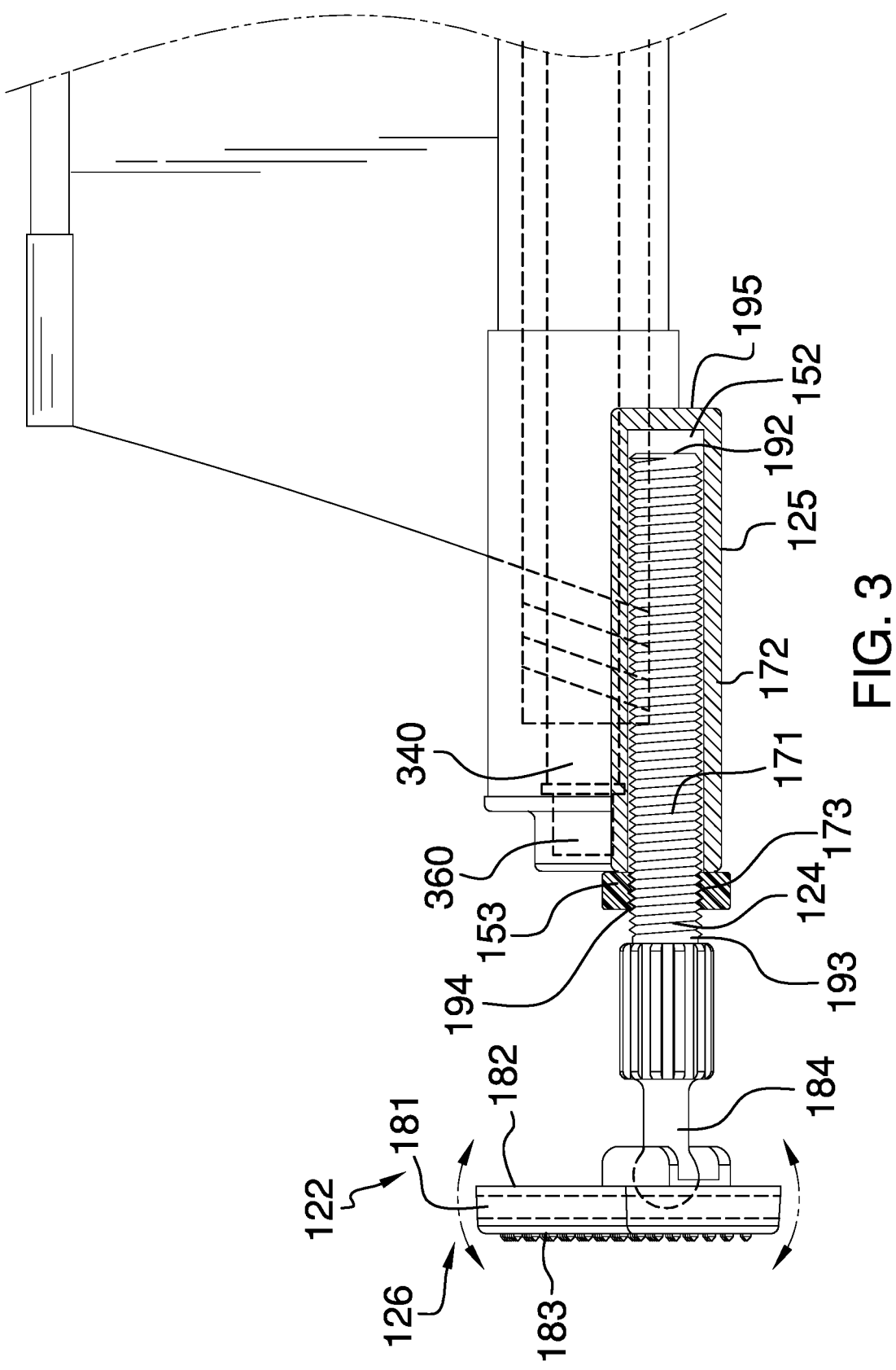
FIG. 3 is a detail view of an embodiment of the disclosure.
Figure 4:
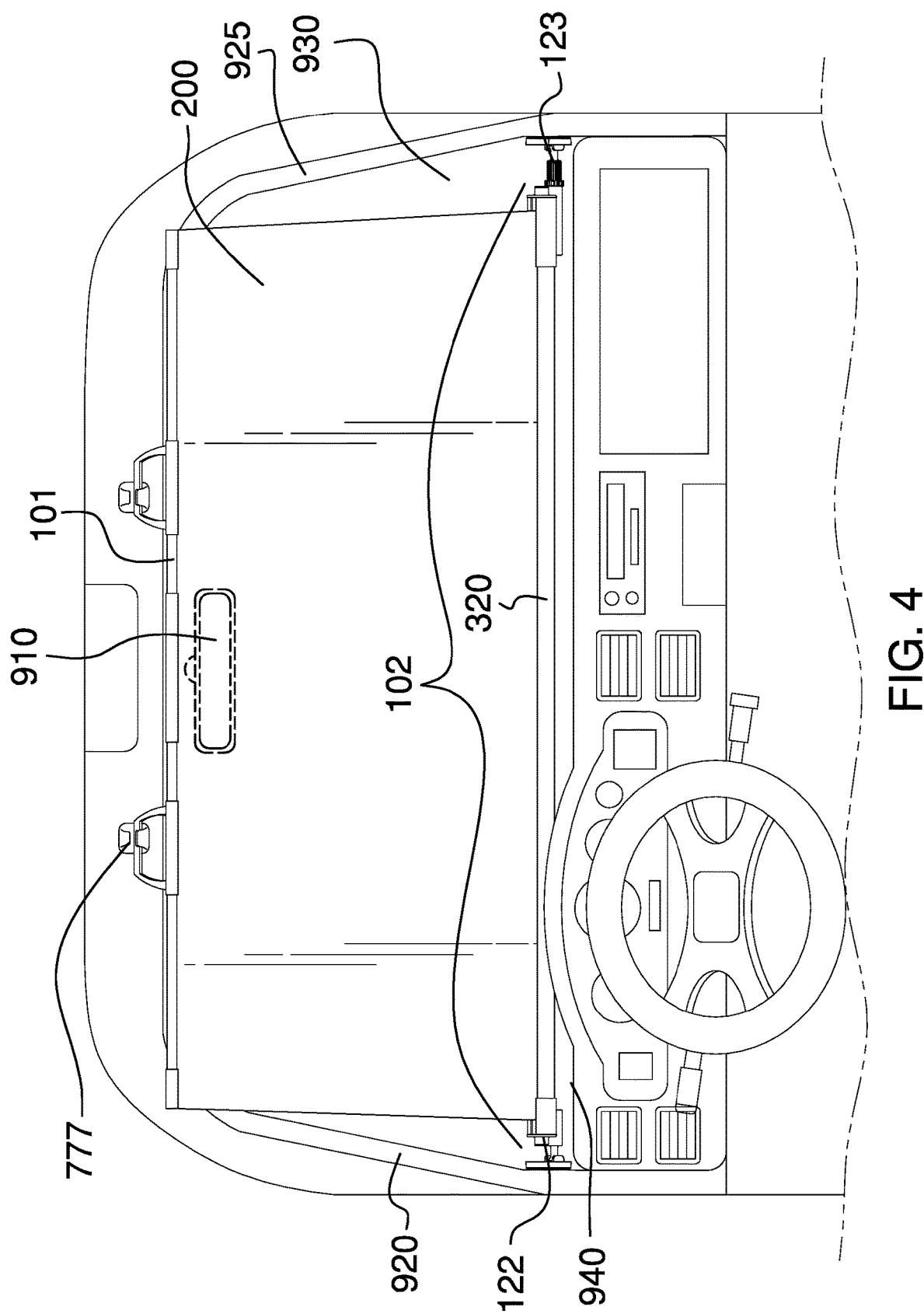
FIG. 4 is an in-use view of an embodiment of the disclosure.
Figure 5:
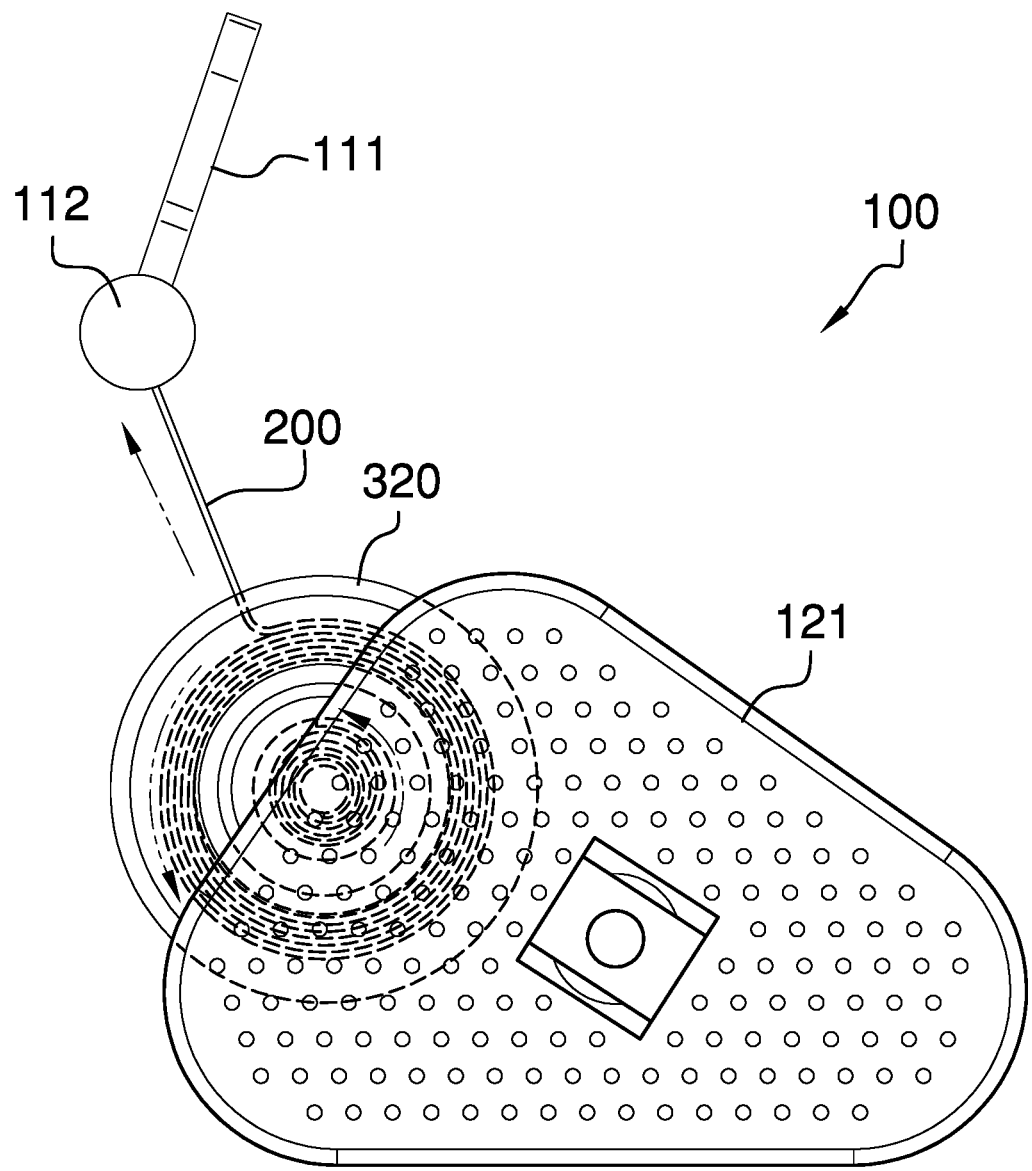
FIG. 5 is a detail view of an embodiment of the disclosure.
Figure 6:
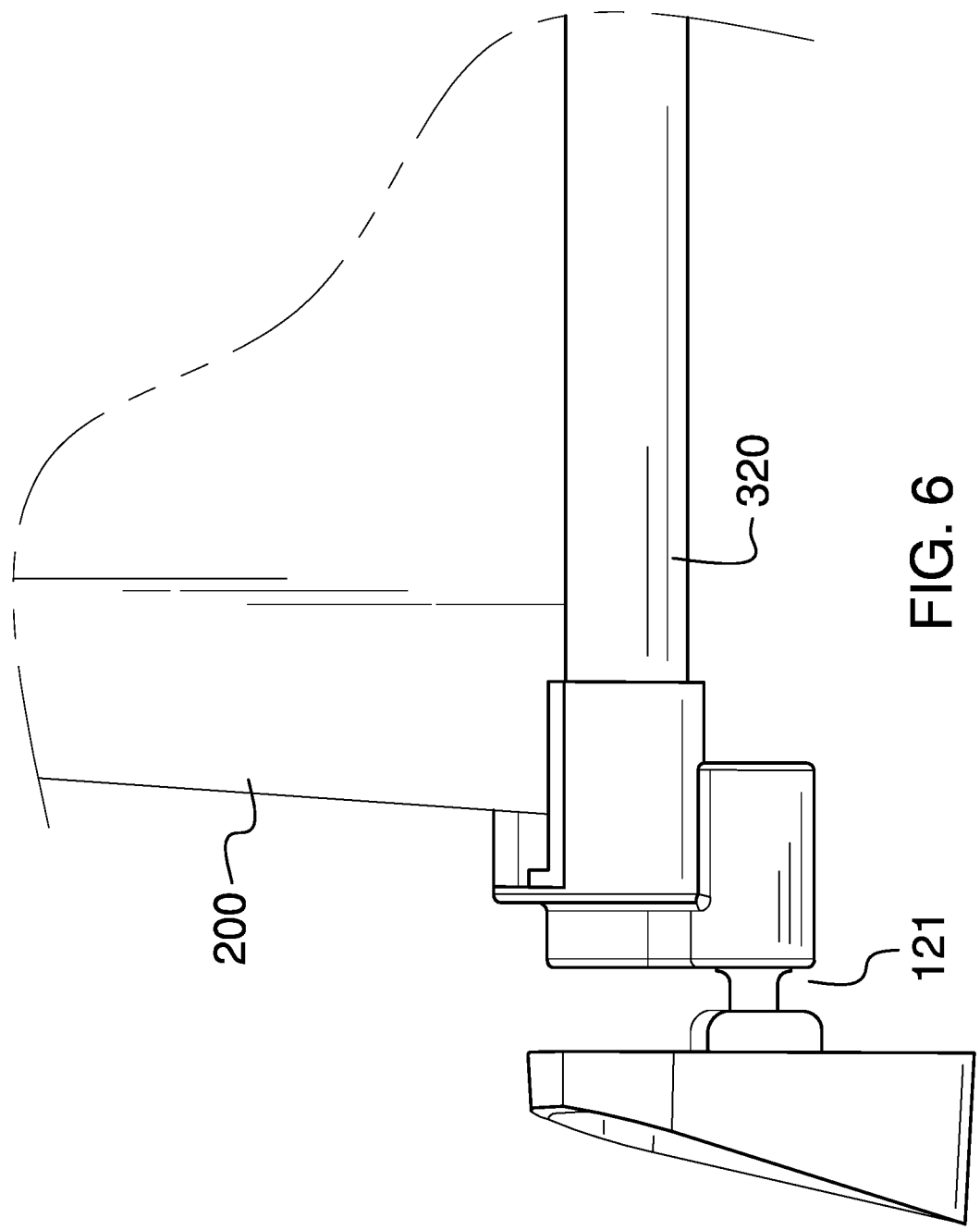
FIG. 6 is a detail view of an embodiment of the disclosure.
Figure 7:
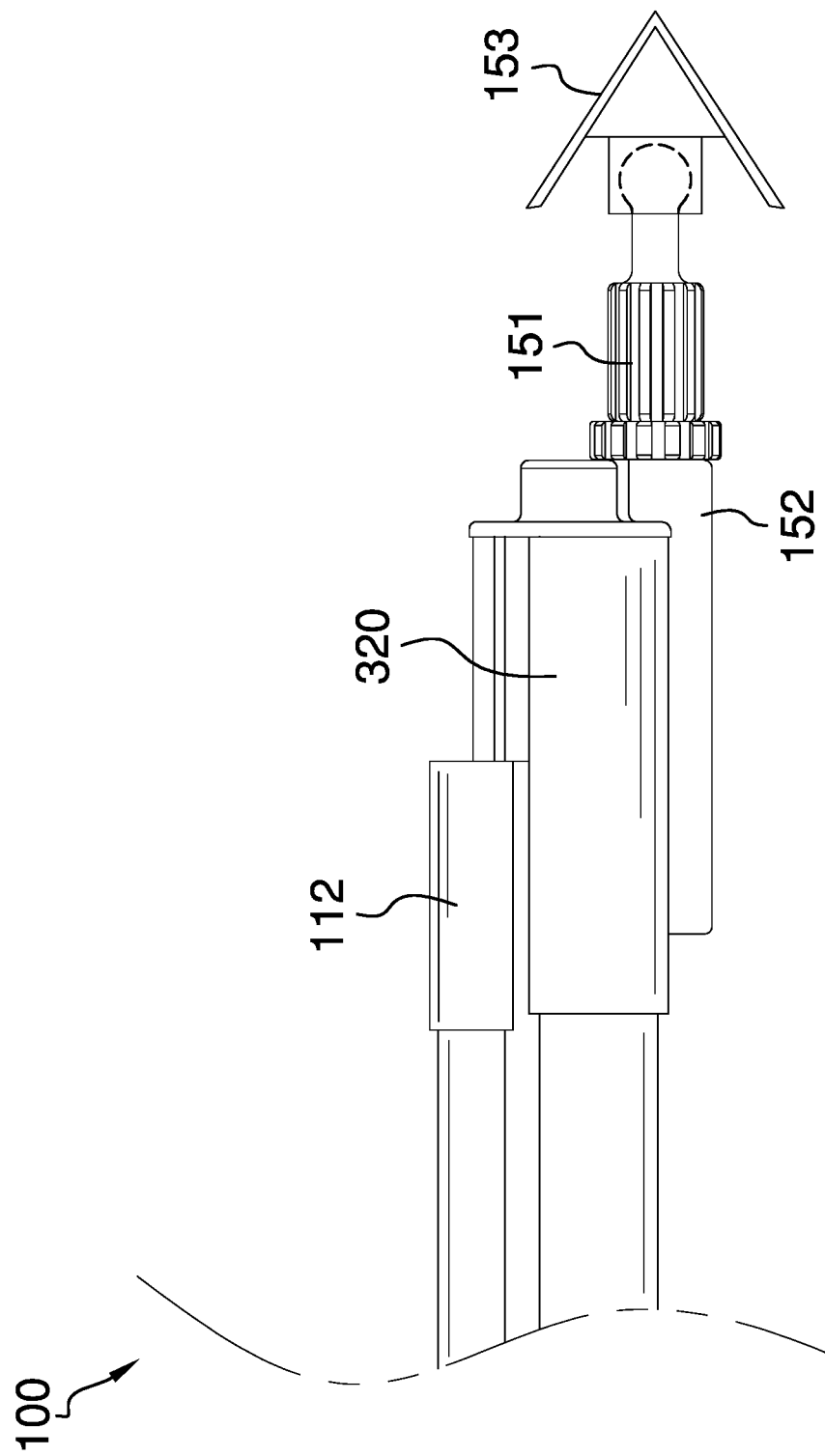
FIG. 7 is a detail view of an embodiment of the disclosure.
Figure 8:
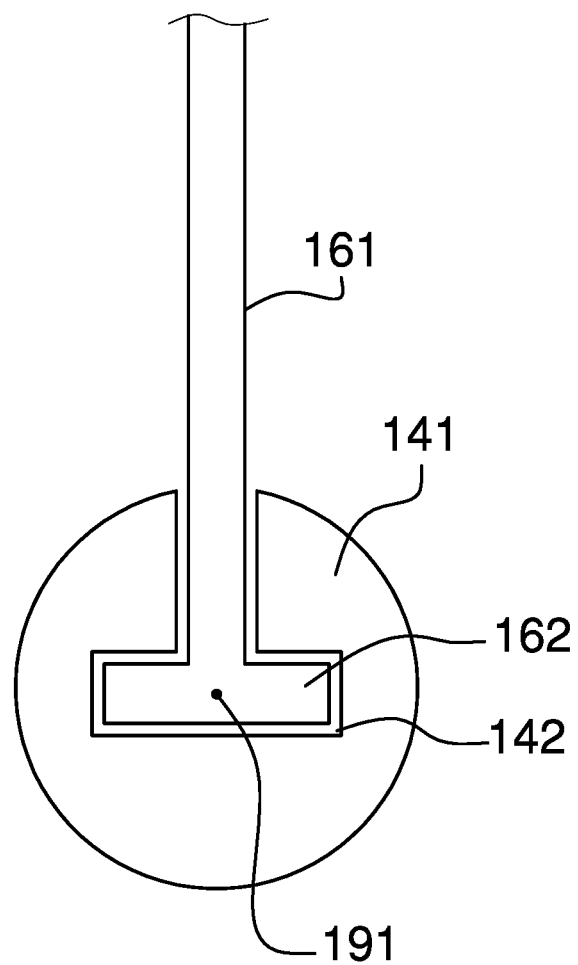
FIG. 8 is a cross-sectional view of an embodiment of the disclosure.

Detailed reference will now be made to one or more potential embodiments of the disclosure, which are illustrated in FIGS. 1 through 8.

This non-provisional application is a continuation-in-part application filed under 37 CFR 1.53(b) that claims the benefit of United States 35 USC 120 from non-provisional application U.S. Ser. No. 15/464,448 filed on Mar. 17, 2017, by the inventor: Traci Pettit. This non-provisional application incorporates non-provisional application U.S. Ser. No. 15/464,448 in its entirety. The current presentation of the dashboard-mounted retractable sunscreen discloses enhancements that supplement the prior disclosure.

The dashboard-mounted retractable sunscreen 100 (hereinafter invention) discloses enhancements that supplement a roller screen disclosed in the prior disclosure. The invention 100 is further defined with a sunshade 200, a top rod 112, and a roller subassembly 300. The roller subassembly 300 is further defined with a housing 320, a roller 340, a left spring 360, and a right spring 365. The vehicle is further defined with a rearview mirror 910, a left 'A' pillar 920, a right 'A' pillar 925, a windshield 930, and a dashboard 940.

The invention 100 includes a dual hook mechanism 101 and a plurality of jacks 102. The dual hook mechanism 101: a) adds one or more additional hooks to the top rod 112; and, b) allows the position of each of the plurality of hooks to move in a direction parallel to the center axis 191 of the top rod 112.

The dual hook mechanism 101 holds the sunshade 200 in a deployed position. The dual hook mechanism 101 attaches the sunshade 200 to a structure positioned at or near the roof of the vehicle. An example of such a structure includes, but is not limited to the rearview mirror 910. Another example of such a structure includes, but is not limited to a vehicle sun visor clip 777, which is affixed at or near a roof of the vehicle (see FIG. 4). The vehicle sun visor clip 777 enables each of the plurality of handles 111 to secure the sunshade 200 in an extended position in order to block the entry of light into the vehicle through the windshield 930. The dual hook mechanism 101 is an adjustable structure such that the position of each hook contained in the dual hook mechanism 101 is adjustable. The dual hook mechanism 101 comprises a plurality of handles 111 and an enhanced top rod 112.

Each of the plurality of handles 111 is a structure that allows for the manipulation of the invention 100. The plurality of handles 111 extend and retract the sunshade 200 into and out of the housing 320 of the roller subassembly 300. The plurality of handles 111 hangs the sunshade 200 above the dashboard 940 such that the sunshade 200 blocks the entry of light into the vehicle through the windshield 930. The position of each of the plurality of handles 111 is adjustable such that each of the plurality of handles 111 moves in a direction parallel to the center axis 191 of the enhanced top rod 112. The center axis 191 is the center axis 191 of the prism-shaped structure that forms the prism shaft 141.

The plurality of handles 111 comprises a left handle 131 and a right handle 132.

The left handle 131 is a handle selected from the plurality of handles 111. The position of the left handle 131 is between the left jack 122 and the right handle 132. The left handle 131 comprises a left grip 161 and a left rail 162. The right handle 132 is a handle selected from the plurality of handles 111. The position of the right handle 132 is between the right jack 123 and the left handle 131. The right handle 132 comprises a right grip 163 and a right rail 164.

The enhanced top rod 112 is a prism-shaped shaft structure. The enhanced top rod 112 attaches to the loose end of the sunshade 200 that pulls out of the housing 320. The enhanced top rod 112 stiffens the loose end of the sunshade 200. The plurality of handles 111 attach to the enhanced top rod 112 such that each of the plurality of handles 111 moves along the length of the enhanced top rod 112 in a direction that is parallel to the center axis 191 of the enhanced top rod 112. The enhanced top rod 112 comprises a prism shaft 141 and a channel 142. The prism shaft 141 is further defined with a center axis 191.

The prism shaft 141 is a prism-shaped shaft structure used to form the physical structure of the enhanced top rod 112. The channel 142 is a negative space formed in the prism shaft 141. The channel 142 has a tee shape. The channel 142 is formed through the prism shaft 141 in a direction parallel to the center axis 191 of the prism shaft 141. The position of the channel 142 within the prism shaft 141 is such that the center axis 191 of the prism shaft 141 is contained within the cross prism of the tee shape of the channel 142.

The left grip 161 is a structure that forms a grip used to manually manipulate the sunshade 200 by hand. The left rail 162 is a tee shaped structure that attaches to and projects away from the left grip 161. The left rail 162 forms an inner perimeter that is sized to fit within the outer perimeter formed by the channel 142 of the prism shaft 141. The insertion of the left rail 162 in the channel 142 attaches the left handle 131 to the enhanced top rod 112 in the manner of a T fastener. The insertion of the left rail 162 in the channel 142 further guides the movement of the left handle 131 along the center axis 191 of the prism shaft 141.

The right grip 163 is a structure that forms a grip used to manually manipulate the sunshade 200 by hand. The right rail 164 is a tee shaped structure that attaches to and projects away from the right grip 163. The right rail 164 forms an inner perimeter that is sized to fit within the outer perimeter formed by the channel 142 of the prism shaft 141. The insertion of the right rail 164 in the channel 142 attaches the right handle 132 to the enhanced top rod 112 in the manner of a T fastener. The insertion of the right rail 164 in the channel 142 further guides the movement of the right handle 132 along the center axis 191 of the prism shaft 141.

The plurality of jacks 102 secure the housing 320 of the roller subassembly 300 to the left 'A' pillar 920 and the right 'A' pillar 925 of the vehicle. The plurality of jacks 102 comprises a collection of individual jacks 121.

Each individual jack 121 is a mechanical structure used to brace the housing 320 of the roller subassembly 300 against a pillar selected from the group consisting of the left 'A' pillar 920 and the right 'A' pillar 925. The span of the length of the individual jack 121 is adjustable such that the invention 100 adjusts to accommodate variations in the span of the distance between the left 'A' pillar 920 and the right 'A' pillar 925 that occur between makes and models of a vehicle. Each individual jack 121 is identical. The individual jack 121 is a jack post. Each individual jack 121 attaches to an end of the housing 320 of the roller subassembly 300.

Each individual jack 121 comprises a supporting cylinder 151, an anchor prism 152, and a brace plate 153. The supporting cylinder 151 is further defined with an anchored end 192 and a free end 193. The supporting cylinder 151 further comprises an exterior screw thread 171. The anchored end 192 is the end of the supporting cylinder 151 that attaches to the anchor prism 152. The free end 193 is the end of the supporting cylinder 151 that is distal from the anchored end 192. The exterior screw thread 171 is a helical structure formed on the exterior surface of the supporting cylinder 151. The exterior screw thread 171 is defined elsewhere in this disclosure.

The supporting cylinder 151 is a bolt. The supporting cylinder 151 and the associated exterior screw thread 171 are sized such that the supporting cylinder 151 will screw into the anchor prism 152. The free end 193 of the supporting cylinder 151 attaches to the brace plate 153 of the individual jack 121. The anchored end 192 of the supporting cylinder 151 screws into the open end 194 of the anchor prism 152. The span of the length of the individual jack 121 is determined by the depth the supporting cylinder 151 screws into the anchor prism 152.

The anchor prism 152 is a capped tube 172. The lateral face of the anchor prism 152 attaches to the lateral face of the housing 320 such that the open end 194 extends beyond the end of the housing 320. The anchor prism 152 comprises a capped tube 172 and an interior screw thread 173. The interior screw thread 173 is formed on the interior surface of the capped tube 172 that forms the anchor prism 152. The anchor prism 152 is further defined with an open end 194 and a closed end 195. The open end 194 is the end of the anchor prism 152 that is distal from the closed end 195. The closed end 195 is the end of the anchor prism 152 that is closed.

The capped tube 172 is a structure formed in the shape of a capped tube 172. The capped tube 172 is defined elsewhere in this disclosure. The interior screw thread 173 is a helical structure formed on the interior surface of the capped tube 172 of the anchor prism 152. The interior screw thread 173 is defined elsewhere in this disclosure.

The anchored end 192 of the supporting cylinder 151 screws into the free end 193 of the anchor prism 152 such that the exterior screw thread 171 interconnects with the interior screw thread 173 to form a threaded connection. The threaded connection is defined elsewhere in this disclosure.

The brace plate 153 is a disk structure. The brace plate 153 attaches to the free end 193 of the supporting cylinder 151 such that the brace plate 153, the supporting cylinder 151, and the anchor prism 152 form a composite prism. The brace plate 153 is the structure of the individual jack 121 that presses against a pillar selected from the group consisting of the left 'A' pillar 920 and the right 'A' pillar 925. The brace plate 153 comprises a rigid plate 181, a cushion 182, a non-skid material 183, and a universal joint 184.

The rigid plate 181 is a rigid structure. The rigid plate 181 is a disk-shaped structure. The rigid plate 181 forms a composite prism structure with the supporting cylinder 151 when the brace plate 153 attaches to the supporting cylinder 151. The cushion 182 is an elastomeric coating that encloses the rigid plate 181. The cushion 182 prevents the rigid plate 181 from damaging a structure selected from the group consisting of the left 'A' pillar 920, the right 'A' pillar 925, and the dashboard 940.

The non-skid material 183 is a surface treatment applied to the exterior surface of the cushion 182 that is placed on the surface of the brace plate 153 and that is distal from the universal joint 184. The non-skid material 183 prevents the brace plate 153 from slipping when placed against the pillar selected from the group consisting of the left 'A' pillar 920 and the right 'A' pillar 925.

The universal joint 184 is a locking structure that attaches the brace plate 153 to the free end 193 of the supporting cylinder 151. The universal joint 184 allows the angle between the rigid plate 181 and a pillar selected from the group consisting of the left 'A' pillar 920 and the right 'A' pillar 925 to be adjusted to customize the fit of the brace plate 153 to the selected pillar.

The plurality of jacks 102 comprises a left jack 122 and a right jack 123. The left jack 122 and the right jack 123 mount on the housing 320 such that the left jack 122 and the right jack 123 form a mirror image when the invention 100 is viewed from a direction perpendicular to the lateral face of the housing 320.

The left jack 122 is the individual jack 121 selected from the plurality of jacks 102. The left jack 122 comprises a left supporting cylinder 124, a left anchor prism 125, and a left brace plate 126. The left supporting cylinder 124 is the supporting cylinder 151 of the left jack 122. The left anchor prism 125 is the anchor prism 152 of the left jack 122. The left brace plate 126 is the brace plate 153 of the left jack 122.

The right jack 123 is the individual jack 121 selected from the plurality of jacks 102. The right jack 123 comprises a right supporting cylinder 127, a right anchor prism 128, and a right brace plate 129. The right supporting cylinder 127 is the supporting cylinder 151 of the right jack 123. The right anchor prism 128 is the anchor prism 152 of the right jack 123. The right brace plate 129 is the brace plate 153 of the right jack 123.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Bolt: As used in this disclosure, a bolt is a cylindrical shaft formed with an exterior screw thread. A bolt is defined with an outer diameter.

Brace: As used in this disclosure, a brace is a structural element that is used to support or otherwise steady an object.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Capped Tube: As used in this disclosure, a capped tube is a tube with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Channel: As used in this disclosure, a channel is a tubular passage through which an object or fluid is passed through.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar. Use Prism, pyramid, geometrically similar, truncated, align Correspond: As used in this disclosure, the term correspond is used as a comparison between two or more objects wherein one or more properties shared by the two or more objects match, agree, or align within acceptable manufacturing tolerances.

Cushion: As used in this disclosure a cushion is a structure formed from a pad that is used to prevent injury or damage to a person or object.

Cylinder: As used in this disclosure, a cylinder is a geometric structure defined by two identical flat and parallel ends, also commonly referred to as bases, which are circular in shape and connected with a single curved surface, referred to in this disclosure as the lateral face. The cross section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Disk: As used in this disclosure, a disk is a prism-shaped object that is flat in appearance. In this disclosure, the surface area of the ends of the prism-shaped object that forms the disk is greater than the lateral face of the prism-shaped object that forms the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Exterior Screw Thread: An exterior screw thread is a ridge wrapped around the outer surface of a tube in the form of a helical structure that is used to convert rotational movement into linear movement.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Hang: As used in this disclosure, to hang an object is to suspend an object above a surface from above such that the inferior end of the object need not form a significant portion of the load path of the object.

Hook: As used in this disclosure, a hook is an object that is curved or bent at an angle such that items can be hung on or caught by the object.

Inferior: As used in this disclosure, the term inferior refers to a directional reference that is parallel to and in the same direction as the force of gravity.

Inner Perimeter and Outer Perimeter: As used in this disclosure, the inner perimeter and the outer perimeter refer to two geometrically similar structures two objects. The inner perimeter refers to the geometrically similar structure with the shorter span. The outer perimeter refers to the geometrically similar structure with the greater span.

Interior Screw Thread: An interior screw thread is a groove that is formed around the inner surface of a tube in the form of a helical structure that is used to convert rotational movement into linear movement.

Jack Post: As used in this disclosure, a jack post is a temporary structure commonly used to lift loads and brace structures. The jack comprises a threaded connection wherein a supporting cylinder screws into an anchor cylinder such that the length of the jack post is adjustable. The load path of the braced or lifted load is transferred through both the supporting cylinder and the anchor cylinder to a supporting structure. Jack posts are often provisioned with a locking mechanism.

Lock: As used in this disclosure, a lock is a fastening device that secures a rotating mechanical device into a fixed position.

Mirror Image: As used in this disclosure, a mirror image refers to a second object that is a reproduction of a first object wherein the second object is identical to the first object except that the orientation of the second object is reversed relative to the first object as if the second object has been reflected by a plane of a mirror (often called the mirror plane or plane of reflection).

Negative Space: As used in this disclosure, negative space is a method of defining an object through the use of open or empty space as the definition of the object itself, or, through the use of open or empty space to describe the boundaries of an object.

Non-Skid Material: As used in this disclosure, a non-skid material is a material or structure that can be applied to an object such that the object is inhibited from sliding along the surface upon which the object is resting. Non-skid materials are often, but not always, adhesive, elastic, or abrasive materials.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Radial: As used in this disclosure, the term radial refers to a direction that: 1) is perpendicular to an identified central axis; or, 2) projects away from a center point.

Relaxed Shape: As used in this disclosure, a structure is considered to be in its relaxed state when no shear, strain, or torsional forces are being applied to the structure.

Rigid Structure: As used in this disclosure, a rigid structure is a solid structure formed from an inelastic material that resists changes in shape. A rigid structure will permanently deform as it fails under a force.

Screw: As used in this disclosure, to screw is a verb meaning: 1) to fasten or unfasten (unscrew) a threaded connection; or 2) to attach a helical structure to a solid structure.

Superior: As used in this disclosure, the term superior refers to a directional reference that is parallel to and in the opposite direction of the force of gravity.

Tee Shape: As used in this disclosure, the term Tee shape refers to a structure formed from a cross prism and a cantilever prism wherein the cantilever prism attaches to the cross prism such that: a) the cantilever prism attaches to the cross prism in the manner of a cantilever; and, b) the center axis of the cantilever prism intersects with a projects radially away from the center point of the center axis of the cross prism.

Threaded Connection: As used in this disclosure, a threaded connection is a type of fastener that is used to join a first tube-shaped and a second tube-shaped object together. The first tube-shaped object is fitted with a first fitting selected from an interior screw thread or an exterior screw thread. The second tube-shaped object is fitted with the remaining screw thread. The tube-shaped object fitted with the exterior screw thread is placed into the remaining tube-shaped object such that: 1) the interior screw thread and the exterior screw thread interconnect; and, 2) when the tube-shaped object fitted with the exterior screw thread is rotated the rotational motion is converted into linear motion that moves the tube-shaped object fitted with the exterior screw thread either into or out of the remaining tube-shaped object. The direction of linear motion is determined by the direction of rotation.

T Track Fastener: As used in this disclosure, a T track fastener is a fastening device that is used to attach a first object to a second object by sliding the first object on to the second object. The T track fastener further comprises a rail and a channel. The rail is attached to the first object and the channel is attached to the second object such that the first object is attached to the second object when the rail is inserted into the channel.

Tube: As used in this disclosure, the term tube is used to describe a rigid hollow prism with two open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Universal Joint: As used in this disclosure, a universal joint is a method of joining a first shaft to a second shaft such that the center axis of the first shaft and is offset from the center axis of the second shaft. When a universal joint is formed with a locking mechanism, a universal joint can further be used to lock the angle between the first shaft and the second shaft into a fixed position.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A sunscreen comprising:
   a sunshade, a dual hook mechanism and a plurality of jacks, and a roller subassembly;
   wherein the dual hook mechanism and the plurality of jacks attach to the sunshade;
   wherein the dual hook mechanism suspends the sunshade;
   wherein the plurality of jacks secure the sunshade between the left 'A' pillar and the right 'A' pillar;
   wherein the roller subassembly is further defined with a housing, a roller, a left spring, and a right spring;
   wherein the sunscreen is configured for use with a vehicle;
   wherein the vehicle is further defined with a rearview mirror, a left 'A' pillar, a right 'A' pillar, a windshield, and a dashboard;
   wherein the dual hook mechanism is an adjustable structure;
   wherein a position of a hook contained in the dual hook mechanism is adjustable.

2. The sunscreen according to claim 1
   wherein the plurality of jacks secure the housing of the roller subassembly to the left 'A' pillar and the right 'A' pillar;
   wherein the plurality of jacks comprises a collection of individual jacks;
   wherein each individual jack is a mechanical structure used to brace the housing of the roller subassembly against a pillar selected from the group consisting of the left 'A' pillar and the right 'A' pillar;
   wherein the span of the length of the individual jack is adjustable.

3. The sunscreen according to claim 2
   wherein the dual hook mechanism comprises a plurality of handles and an enhanced top rod;

wherein the plurality of handles attach to the enhanced top rod;
wherein the plurality of handles hangs the sunshade above the dashboard.

4. The sunscreen according to claim 3
wherein the enhanced top rod is a prism-shaped shaft structure;
wherein the enhanced top rod attaches to a loose end of the sunshade;
wherein the enhanced top rod stiffens the loose end of the sunshade;
wherein the plurality of handles attach to the enhanced top rod such that each of the plurality of handles moves along the length of the enhanced top rod in a direction that is parallel to the center axis of the enhanced top rod.

5. The sunscreen according to claim 4
wherein the enhanced top rod comprises a prism shaft and a channel;
wherein the channel is formed in the prism shaft;
wherein the prism shaft is further defined with a center axis.

6. The sunscreen according to claim 5
wherein the prism shaft forms the physical structure of the enhanced top rod;
wherein the channel is a negative space formed in the prism shaft;
wherein the channel has a tee shape;
wherein the channel is formed through the prism shaft in a direction parallel to the center axis of the prism shaft;
wherein the position of the channel within the prism shaft is such that the center axis of the prism shaft is contained within a cross prism of the tee shape of the channel.

7. The sunscreen according to claim 6
wherein the plurality of handles comprises a left handle and a right handle;
wherein the left handle comprises a left grip and a left rail;
wherein the right handle comprises a right grip and a right rail;
wherein the left handle and the right handle are each configured to secure to a vehicle sun visor clip of the vehicle in order to secure the sunshade in an extended position in order to block the entry of light into the vehicle through the windshield.

8. The sunscreen according to claim 7
wherein the left grip is a structure that forms a grip;
wherein the left rail is a tee shaped structure that attaches to and projects away from the left grip;
wherein the right grip is a structure that forms a grip;
wherein the right rail is a tee shaped structure that attaches to and projects away from the right grip.

9. The sunscreen according to claim 8
wherein the insertion of the left rail in the channel attaches the left handle to the enhanced top rod in the manner of a T fastener;
wherein the insertion of the left rail in the channel further guides the movement of the left handle along the center axis of the prism shaft;
wherein the insertion of the right rail in the channel attaches the right handle to the enhanced top rod in the manner of a T fastener;
wherein the insertion of the right rail in the channel further guides the movement of the right handle along the center axis of the prism shaft.

10. The sunscreen according to claim 9
wherein each individual jack is identical;
wherein the individual jack is a jack post;
wherein each individual jack attaches to an end of the housing of the roller subassembly.

11. The sunscreen according to claim 10
wherein each individual jack comprises a supporting cylinder, an anchor prism, and a brace plate;
wherein the supporting cylinder attaches the anchor plate to the brace plate;
wherein the supporting cylinder is further defined with an anchored end and a free end;
wherein the anchor prism is further defined with an open end and a closed end.

12. The sunscreen according to claim 11
wherein the supporting cylinder is a bolt;
wherein the supporting cylinder further comprises an exterior screw thread;
wherein the free end of the supporting cylinder attaches to the brace plate of the individual jack;
wherein the anchored end of the supporting cylinder screws into the open end of the anchor prism.

13. The sunscreen according to claim 12 wherein the span of the length of the individual jack is determined by the depth the supporting cylinder screws into the anchor prism.

14. The sunscreen according to claim 13
wherein the anchor prism comprises a capped tube and an interior screw thread;
wherein the interior screw thread is formed on the interior surface of the capped tube that forms the anchor prism;
wherein the supporting cylinder and the associated exterior screw thread are sized such that the supporting cylinder will screw into the anchor prism;
wherein a lateral face of the anchor prism attaches to the lateral face of the housing such that the open end extends beyond an end of the housing.

15. The sunscreen according to claim 14
wherein the brace plate attaches to the free end of the supporting cylinder such that the brace plate, the supporting cylinder, and the anchor prism form a composite prism;
wherein the brace plate is the structure of the individual jack that presses against a pillar selected from the group consisting of the left 'A' pillar and the right 'A' pillar.

16. The sunscreen according to claim 15
wherein the brace plate comprises a rigid plate, a cushion, a non-skid material, and a universal joint;
wherein the cushion, the non-skid material, and the universal joint attach to the rigid plate.

17. The sunscreen according to claim 16
wherein the rigid plate is a rigid structure;
wherein the rigid plate is a disk-shaped structure;
wherein the cushion is an elastomeric coating that encloses the rigid plate;
wherein the non-skid material is a surface treatment applied to the exterior surface of the cushion that is placed on the surface of the brace plate and that is distal from the universal joint;
wherein the universal joint is a locking structure that attaches the brace plate to the free end of the supporting cylinder.

18. The sunscreen according to claim 17
wherein the plurality of jacks comprises a left jack and a right jack;
wherein the left jack and the right jack mount on the housing such that the left jack and the right jack form a mirror image when the sunscreen is viewed from a direction perpendicular to the lateral face of the housing.

\* \* \* \* \*